(12) United States Patent
Wu et al.

(10) Patent No.: US 7,200,221 B2
(45) Date of Patent: Apr. 3, 2007

(54) METHODS AND SYSTEMS FOR PROVIDING MULTI-PATH ECHO CANCELLATION

(75) Inventors: Cheng-Shing Wu, Miaoli (TW); An-Yeu Wu, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 447 days.

(21) Appl. No.: 10/316,119

(22) Filed: Dec. 11, 2002

(65) Prior Publication Data

US 2003/0215086 A1 Nov. 20, 2003

Related U.S. Application Data

(60) Provisional application No. 60/378,066, filed on May 16, 2002.

(51) Int. Cl.
*H04M 1/00* (2006.01)

(52) U.S. Cl. .......................... 379/406.06; 379/406.01; 379/406.08; 379/406.11

(58) Field of Classification Search ........... 379/406.01, 379/406.06, 406.08, 406.11
See application file for complete search history.

(56) References Cited

U.S. PATENT DOCUMENTS

| | | | | |
|---|---|---|---|---|
| 5,084,865 A | * | 1/1992 | Koike | 379/406.05 |
| 5,343,522 A | * | 8/1994 | Yatrou et al. | 379/406.09 |
| 5,675,644 A | * | 10/1997 | Sih | 379/406.08 |
| 2005/0117739 A1 | * | 6/2005 | Demirekler et al. | 379/406.08 |

OTHER PUBLICATIONS

Philip Chu-Wah Yip and Delores M. Etter, Oct. 1990, IEEE Transactions on communications, vol. 38, No. 10, pp. 1694-1695.*
D.G. Messerschmitt, "Echo cancellation in speech and data transmission," *IEEE J. Select. Areas in Commun.*, vol. 2, pp. 283-297, Mar. 1984.
C.-P. Tzeng, *Timing recovery in digital subscriber loops.* Ph.D. Thesis, University of California, Berkeley, 1985.
International Telecommunication Union, "Single-pair high-speed digital subscriber line (SHDSL)) transceivers." ITU-I G.991.2, Feb. 2001.
G.W. Davidson and D.D. Falconer, "Reduced complexity echo cancellation using orthonormal functions," *IEEE Trans. Circuits Syst.*, vol. 38, pp. 20-28, Jan. 1991.
A. Abousaada, T. Aboulnasr, and W. Steenaart, "An echo tail canceller based on adaptive interpolated FIR filtering," *IEEE Trans. Circuits Syst. II*, vol. 39, pp. 409-416, Jul. 1992.
S.S. Lin and W.R. Wu, "A low complexity adaptive interpolated FIR echo canceller," in *Proc. IEEE Int. Symp. Circuits and Syst.*, vol. IV, pp. 438-441, 2001.

(Continued)

*Primary Examiner*—Jefferey Harold
(74) *Attorney, Agent, or Firm*—Finnegan, Henderson, Farabow, Garrett & Dunner, L.L.P.

(57) ABSTRACT

Providing multi-path echo cancellation comprises providing a main echo signal corresponding to a main echo section of an echo response and providing a plurality of tail echo signals, each of the plurality of tail echo signals corresponding to respective tail echo sections of the echo response. Next, providing a multi-path echo canceller comprises summing the main echo signal and the plurality of tail echo signals to provide a synthesized echo.

48 Claims, 11 Drawing Sheets

OTHER PUBLICATIONS

Y. Neuvo, D. Cheng-Yu, and S.K. Mitra, "Interpolated finite impulse response filters," *IEEE Trans. Acoust. Speech, Signal Processing*, vol. 32, pp. 563-570, Jun. 1984.

S. Haykin, *Adaptive Filter Theory*. New Jersey: Prentice Hall, Inc., 3rd ed., 1996.

A.V. Oppenheim and R.W. Schafer, *Discrete Time Signal Processing*. New Jersey: Prentice Hall, Inc., 1989.

T. Saramaki, T. Neuvo, and S.K. Mitra, "Design of Computational efficient interpolated FIR filters," *IEEE Tarns. Circuits Syst.*, vol. 35, pp. 70-88, Jan. 1988.

T.W. Parks and C.S. Burrus, *Digital Filter Design*. New York: John Wiley & Sons, 1987.

J.G. David Forney and M.V. Eyuboglu, "Combined equalization and coding using precoding," *IEEE Commun. Magazine*, pp. 25-34, Dec. 1991.

Abousaada, Anis et al., "Performance Analysis of an Efficient AIFIR Echo-Tail Canceller," *IEEE* (1991), pp. 552-555.

Davidson, Gordon W. et al., "Reduced Complexity Echo Cancellation Using Orthonormal Functions," *IEEE Transactions on Circuits and Systems*, vol. 38, No. 1, Jan. 1991, p. 20-28.

\* cited by examiner

| INDEX | ORDER OF MEC | $M_1$ | ORDER OF $TEC_1$ | $M_1$ | ORDER OF $TEC_2$ | ERLE PERFORMANCE |
|---|---|---|---|---|---|---|
| MULTI-PATH AIFIR-BASED ECHO CANCELLER | | | | | | |
| 1 | 64 | 4 | 18 | 8 | 24 | 65.3 dB |
| 2 | 64 | 4 | 18 | 8 | 25 | 67.2 dB |
| 3 | 64 | 4 | 17 | 8 | 27 | 65.4 dB |
| CONVENTIONAL AIFIR-BASED ECHO CANCELLER | | | | | | |
| 4 | 64 | 4 | 70 | - | - | 67.8 dB |
| 5 | 98 | 8 | 30 | - | - | 66.3 dB |
| DIRECT IMPLEMENTATION | | | | | | |
| 6 | 290 | - | - | - | - | 67.4 dB |

*FIG. 8*

| | INDEX | MACs IN MEC | MACs IN TEC$_1$ | MACs IN TEC$_2$ | MACs IN ICF | TOTAL MACs |
|---|---|---|---|---|---|---|
| MULTI-PATH AIFIR-BASED ECHO CANCELLER | 1 | 128 | 36 | 48 | 30 | 242 |
| | 2 | 128 | 36 | 50 | 30 | 244 |
| | 3 | 128 | 34 | 54 | 30 | 246 |
| CONVENTIONAL AIFIR-BASED ECHO CANCELLER | 4 | 128 | 140 | - | 23 | 291 |
| | 5 | 196 | 60 | - | 55 | 311 |
| DIRECT IMPLEMENTATION | 6 | 580 | - | - | - | 580 |

FIG. 9

METHODS AND SYSTEMS FOR PROVIDING MULTI-PATH ECHO CANCELLATION

RELATED APPLICATION

Under provisions of 35 U.S.C. § 119(e), the Applicants claim the benefit of U.S. provisional application No. 60/378,066 filed May 16, 2002, which is incorporated herein by reference.

TECHNICAL FIELD

The present invention relates to the field of providing echo cancellation. More particularly, the present invention, in various specific embodiments, involves methods and systems directed to providing multi-path echo cancellation.

BACKGROUND

Two-wire full duplex digital transmission may be realized in many ways. Among them, echo-cancellation based transmission may achieve the best bandwidth efficiency, lowest transmission rate, and hence the longest range. A high echo cancellation level may be required to protect the far-end signal from the interference of the echo signal. In practice, in addition to 10–20 dB attenuation provided by an analog hybrid circuit, an extra compensation circuit may be required to reduce the echoes to an acceptable level. Usually, this is done by an echo canceller with digital implementation. A digital echo canceller uses data from the transmitter to reproduce the echo by modeling the echo path. Then, the replica of the echo may be subtracted from the received signal in the receiver section, as shown in FIG. 1. In digital subscriber line (DSL) transmission, for example, a practical communication system may require the echo canceller to achieve 60–70 dB echo cancellation.

An implementation of echo cancellation is the transversal filter structure. Given a hybrid circuit and a loop, the complexity of the echo canceller is determined by the factor of m/T. T denotes the symbol period, and m is the number of samples per baud depending on the subsequent processing of echo canceller. For example, most timing recovery techniques require at least two samples per baud (m=2) to retrieve the timing information from the received data signal. As a result, the echo canceller needs to be operated at twice the baud rate so as to provide echo-free samples to a timing recovery block and equalizer. Thus, the complexity of the echo canceller increases linearly with the sampling rate. For higher speed applications such as high bit rate digital subscriber line (HDSL), symmetric digital subscriber line (SDSL), and symmetric high bit rate digital subscriber line (SHDSL), hundreds of taps may be required to achieved the aforementioned high cancellation performance. Thus, there remains a need to efficiently provide echo cancellation.

SUMMARY OF THE INVENTION

Consistent with the present invention, methods and systems for echo cancellation are provided that avoid problems associated with prior methods and systems for echo cancellation as discussed herein above.

In one aspect, a method for providing multi-path echo cancellation comprises providing a main echo signal corresponding to a main echo section of an echo response, providing a plurality of tail echo signals, each of the plurality of tail echo signals corresponding to respective tail echo sections of the echo response, and summing the main echo signal and the plurality of tail echo signals to provide a synthesized echo.

In another aspect, a system for providing multi-path echo cancellation comprises a component for providing a main echo signal corresponding to a main echo section of an echo response, a component for providing a plurality of tail echo signals, each of the plurality of tail echo signals corresponding to respective tail echo sections of the echo response, and a component for summing the main echo signal and the plurality of tail echo signals to provide a synthesized echo.

In yet another aspect, a computer-readable medium on which is stored a set of instructions for providing multi-path echo cancellation, which when executed perform stages comprising providing a main echo signal corresponding to a main echo section of an echo response, providing a plurality of tail echo signals, each of the plurality of tail echo signals corresponding to respective tail echo sections of the echo response, and summing the main echo signal and the plurality of tail echo signals to provide a synthesized echo.

Both the foregoing general description and the following detailed description are exemplary and are intended to provide further explanation of the invention as claimed.

BRIEF DESCRIPTION OF THE DRAWINGS

The accompanying drawings provide a further understanding of the invention and, together with the detailed description, explain the principles of the invention. In the drawings:

FIG. 8 is a table summarizing simulation results for various approaches and parameters consistent with an embodiment of the present invention;

FIG. 9 is a table summarizing the performance of an echo canceller consistent with an embodiment of the present invention;

DETAILED DESCRIPTION

Figure 1:
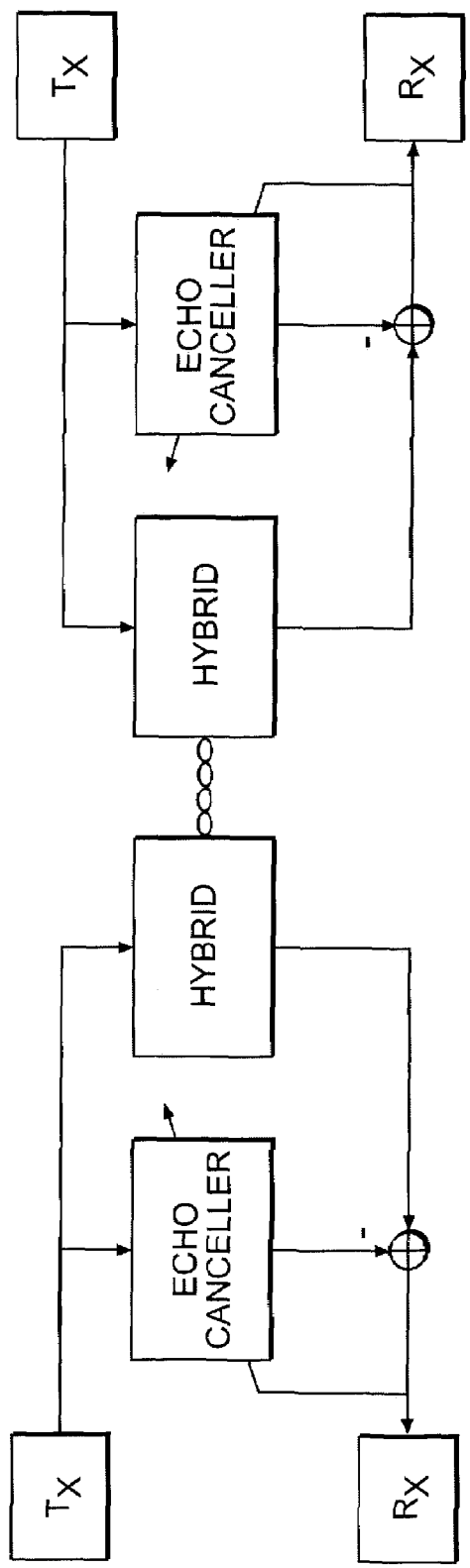
FIG. 1 is a functional block diagram of a prior art echo cancellation system consistent with an embodiment of the present invention.

Reference will now be made to various embodiments according to this invention, examples of which are shown in the accompanying drawings and will be obvious from the description of the invention. In the drawings, the same reference numbers represent the same or similar elements in the different drawings whenever possible.

Consistent with the general principles of the present invention, a system for providing multi-path echo cancellation may comprise a component for providing a main echo signal corresponding to a main echo section of an echo response, a component for providing a plurality of tail echo signals, each of the plurality of tail echo signals corresponding to respective tail echo sections of the echo response, and a component for summing the main echo signal and the plurality of tail echo signals to provide a synthesized echo.

Figure 5:
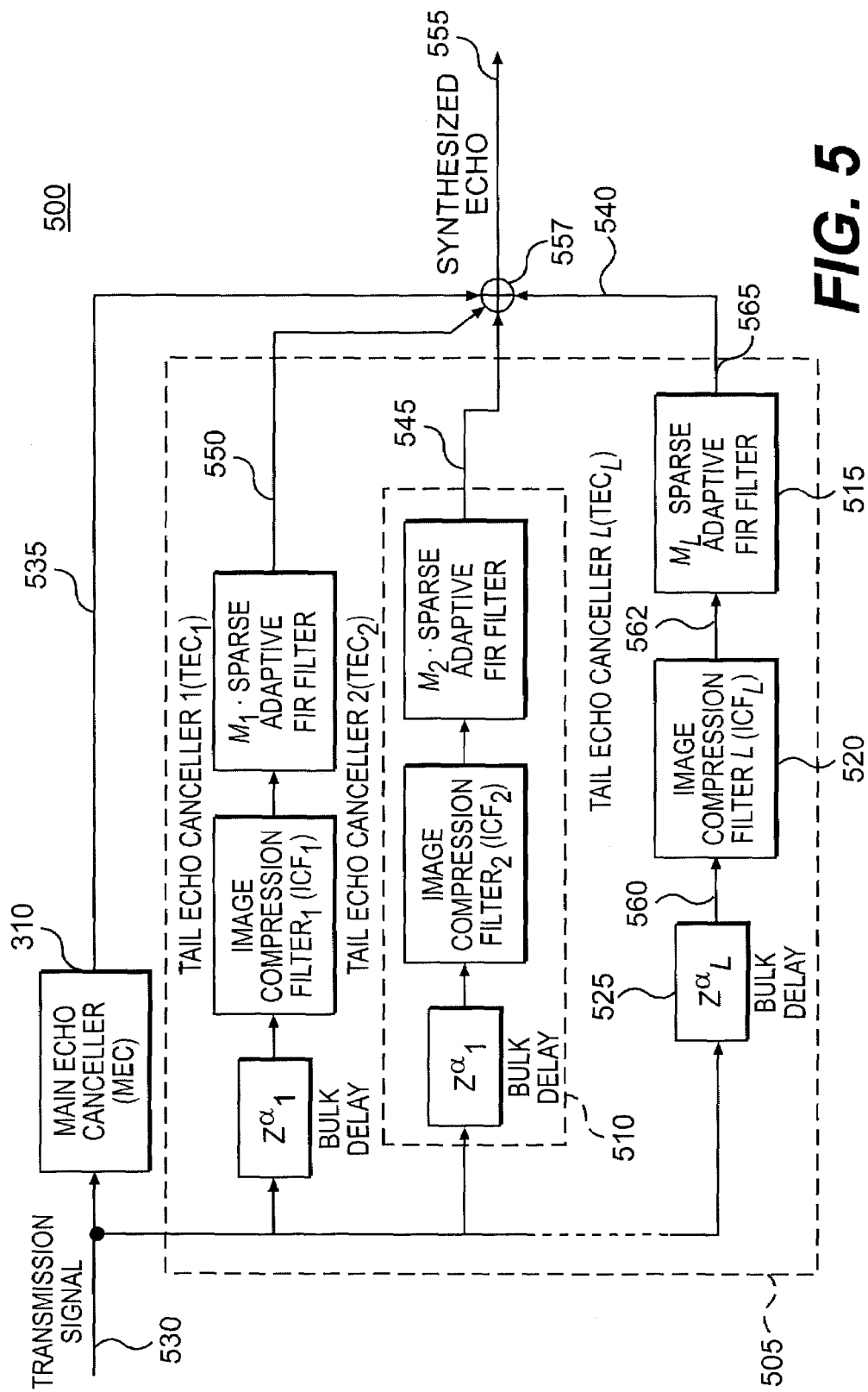
FIG. 5 is a block diagram of a system for providing a multi-path echo canceller consistent with an embodiment of the present invention.

As herein embodied and illustrated in FIG. 5, the system for providing a multi-path echo canceller may comprise a multi-path adaptive interpolated FIR (MPAIFIR)-based echo canceller 500. The elements of system 500 will be described in greater detail below. Consistent with an embodiment of the invention, the component for providing a main echo signal may comprise a main echo canceller (MEC) 310, the component for providing a plurality of tail echo signals may comprise a plurality of tail echo cancellers (TEC) 505, and the component for summing may comprise a summer 557. The above elements are exemplary and other elements may comprise the component for providing a main echo signal, the component for providing a plurality of tail echo signals, and the component for summing.

Consistent with embodiments of the present invention, a multi-path adaptive interpolated FIR-based echo canceller is presented to perform echo cancellation in, for example, full-duplex digital transmission over digital subscriber line (DSL). A multi-path structure is addressed in which more than one adaptive interpolated FIR filters, modeling the their corresponding tail portions of echo path, may be employed. Also, an efficient implementation of an image compress filter (ICF) is provided to reduce the complexity in performing the function of multiple image compress filters. Computer simulations show that the multi-path adaptive interpolated FIR-based echo canceller may reduce by 20% the computational complexity. Moreover, about 60% complexity saving may be obtained compared with direct transversal implementation of an echo canceller.

Figure 2:
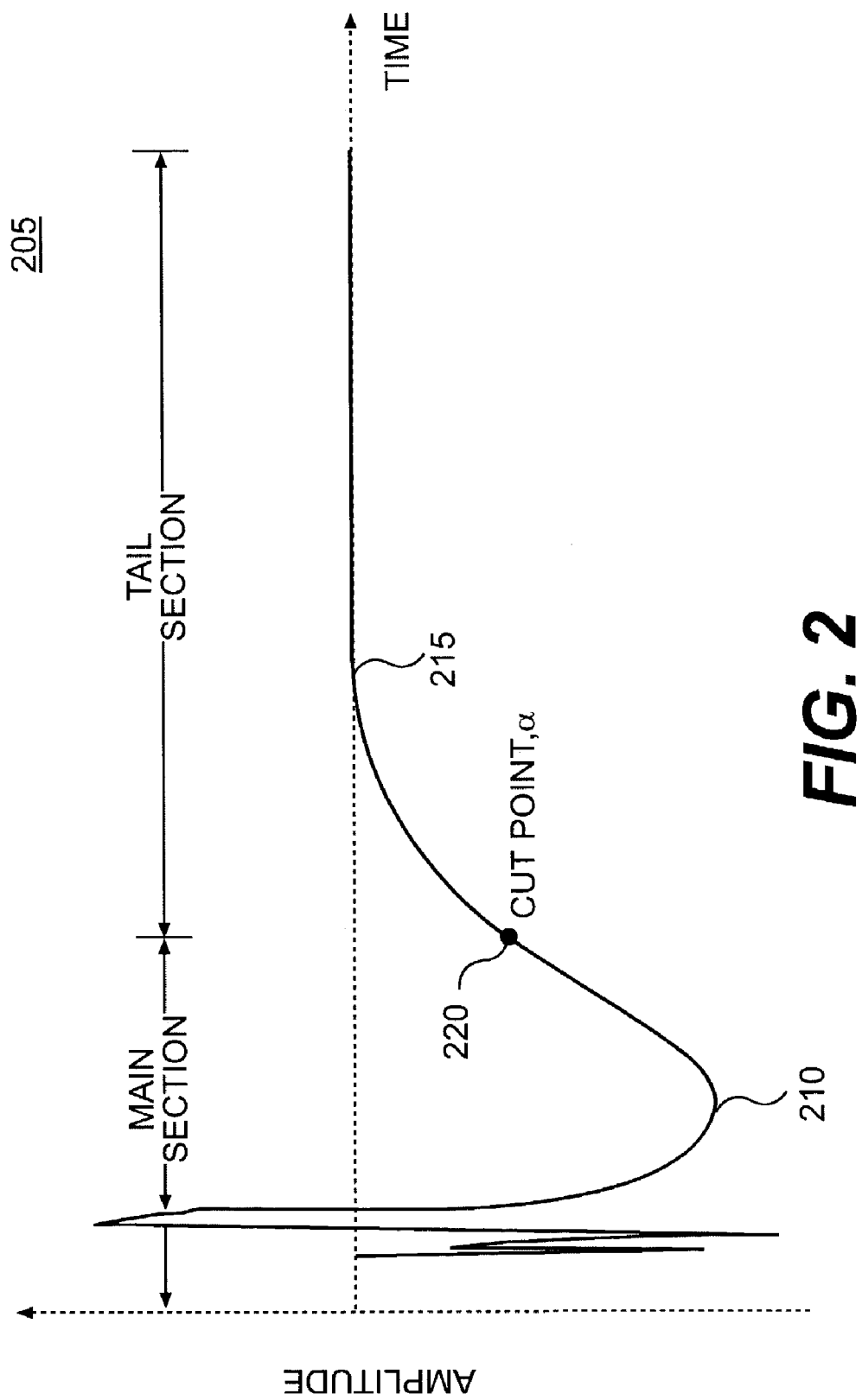
FIG. 2 is an illustration of an impulse response of an echo path consistent with an embodiment of the present invention.

As shown in FIG. 2, reducing the complexity of an adaptive interpolated FIR-based echo canceller may be achieved by dividing an echo response 205 into two sections, a main echo section 210 and a tail echo section 215. The signal of main echo section 210 appears to be abrupt while tail echo section 215 is relatively smooth. In addition, the length of tail echo section 215 may be two times longer than main echo section 210. For some loops, the ratio can be up to 3 or 4. Based on observation, cost-effective structures may be applied to deal with tail echo section 215 of echo response 205 that may largely determine the complexity of the echo canceller.

Figure 3:
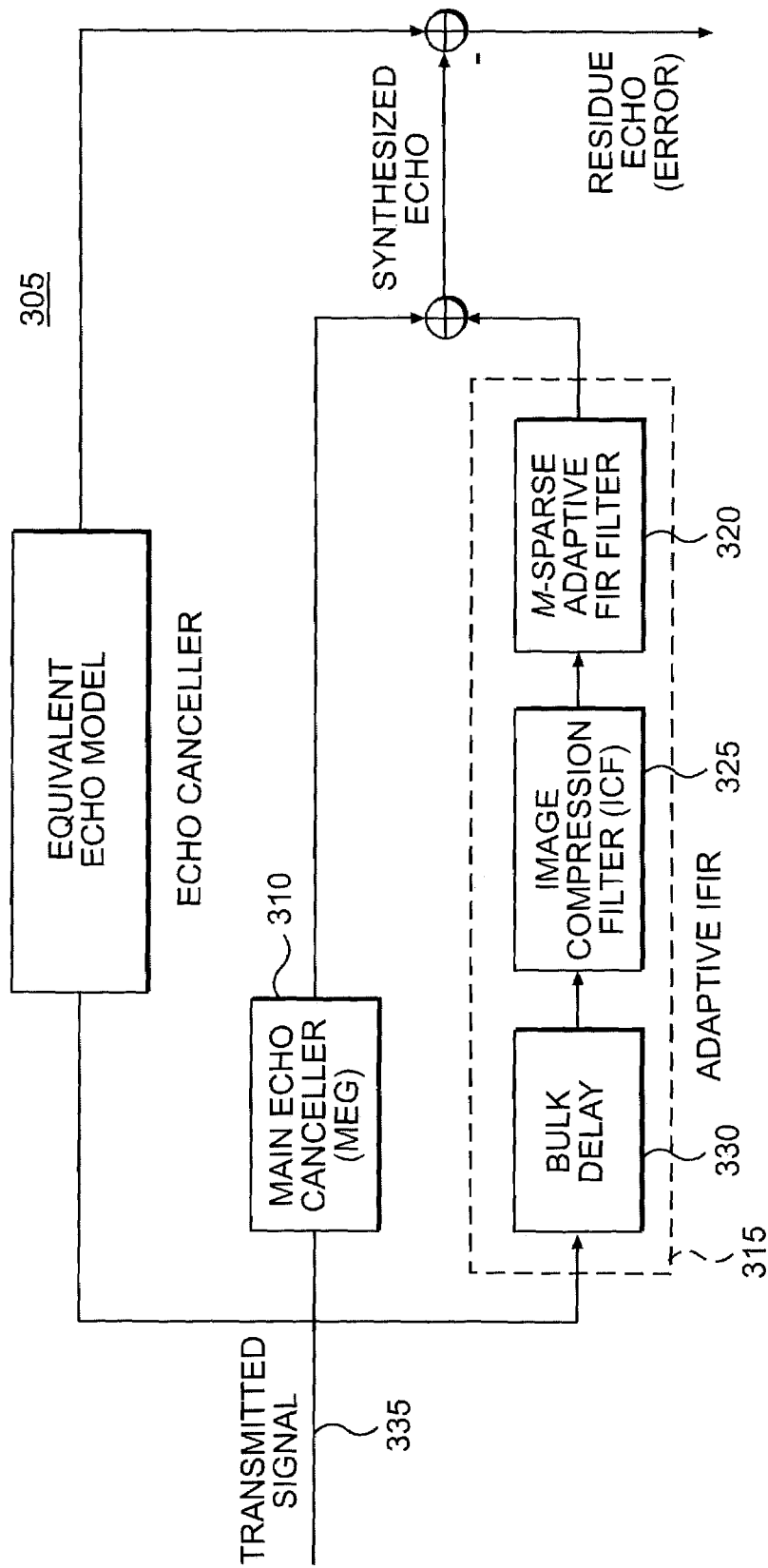
FIG. 3 is a block diagram of a structure of an echo canceller consistent with an embodiment of the present invention.

The structure of an adaptive interpolated FIR-based echo canceller 305 is shown in FIG. 3. Two separate signal paths, main echo canceller (MEC) 310 and a tail echo canceller (TEC) 315, combine to cancel main and tail echoes respectively. In MEC 310, a low-order transversal FIR structure may be employed due to the separated main echoes, which have relative short duration. The long tail portion may then be modeled by a M-sparse adaptive FIR filter 320, where M is the interpolation factor. The term of "M-sparse" signifies that (M−1) null taps may be inserted between each two adjacent taps. The image introduced by M-sparse adaptive FIR filter 320 is then suppressed by image compress filter (ICF) 325. ICF 325 is employed in advance of M-sparse adaptive FIR filter 320. With the help of M-sparse adaptive FIR filter 320 and ICF 325, the effective order of TEC 315 is stretched, hence reducing the complexity of TEC 315. Also, a bulk delay 330 may be used to align TEC 315 to the boundary between main echo section 210 and tail echo section 215. This boundary may be cut point 220, as shown in FIG. 2. While bulk delay 330 is shown to signify the alignment between main echo section 210 and tail echo section 215, practical implementation, may share delay elements in MEC 310 with bulk delay 330 in TEC 315.

In an application of adaptive interpolated FIR-based echo canceller 305, a larger interpolation factor M may be used to lessen the complexity. However, adaptive interpolated FIR-based echo canceller 305 may have some inherent design tradeoffs that may limit its efficiency. These design tradeoffs may be addressed by introducing more than two signal paths in echo canceller 315, hence the name multi-path adaptive interpolated FIR-based echo canceller (MPAIFIR).

By tracing along echo response 205 of FIG. 2 from the tail echo section 215 to main echo section 210, it can be observed that the curve shape changes gradually from smooth to abrupt. This directly implies that frequency bandwidth of the tail echoes grows as the cut point is moved toward main echo section 210. Moreover, given a cut point a and an interpolation factor M, adaptive interpolated FIR-based echo canceller 305 may synthesize the tail echoes if the signal bandwidth of the tail section is less than 1/M.

While increasing the interpolation factor M may help reduce the complexity of TEC 315, the cut point a must be moved toward tail echo section 215 so as to fit the bandwidth of tail echoes into 1/M. This will increase the order (hence the complexity) in the MEC 310. Moreover, increasing M implies the employment of a narrower image compress filter. This also may increase the total complexity of adaptive interpolated FIR-based echo canceller 305, for example.

Figure 4:
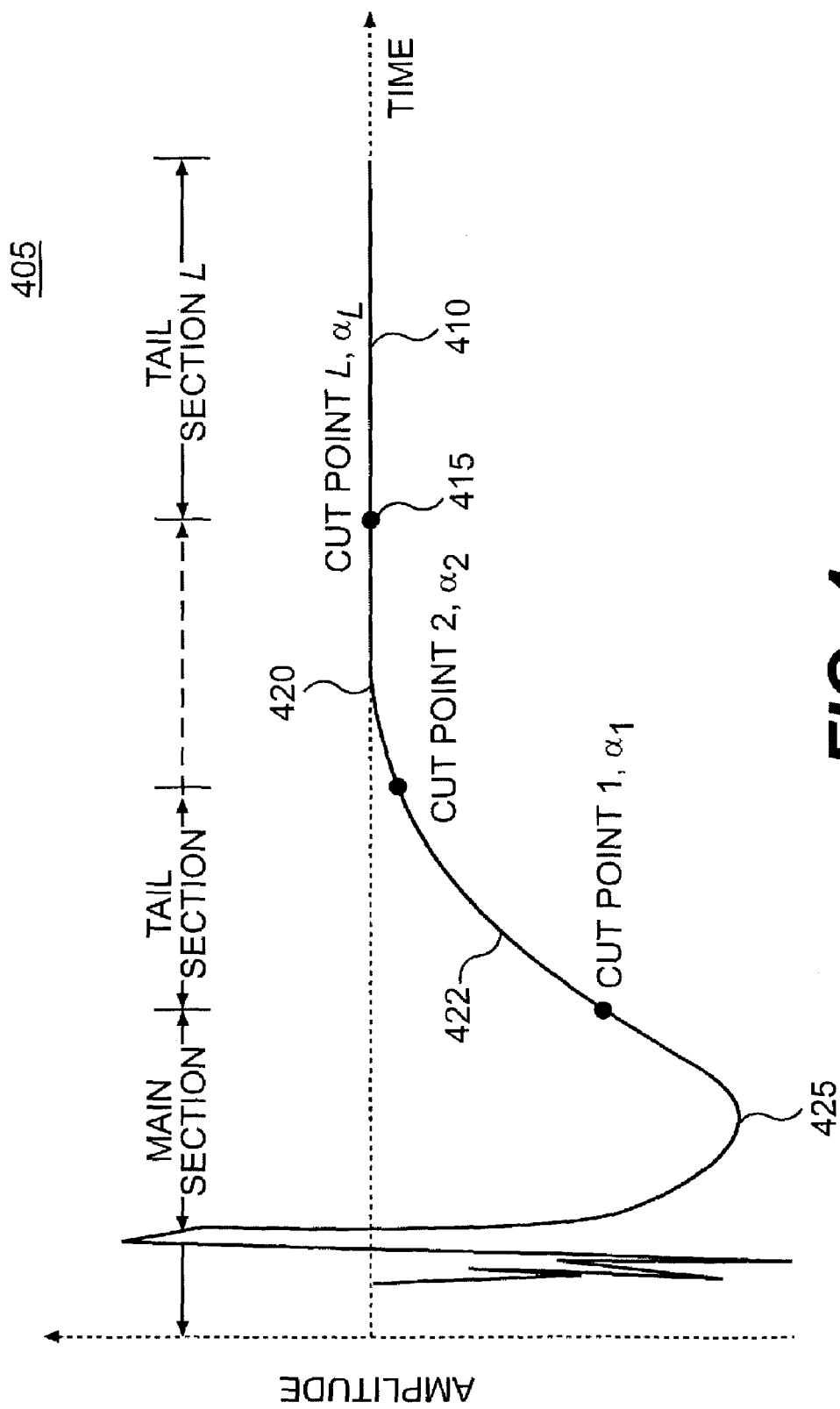
FIG. 4 illustrates the division of an impulse response of an echo path consistent with an embodiment of the present invention.

To solve the above design tradeoffs, echo response 405 may be divided in a finer-grain way. For example, echo response 405 may be divided into more than "main" and "tail" sections. As shown in FIG. 4, where L denotes the number of tail sections, echo response 405 is divided into more than two sections. By doing this, a tail-most part 410 (with a cut point $\alpha_L$ 415 as the boundary) maybe modeled by using a larger interpolation factor, say $M_L$, while modeling a next sub-tail part 420 may be modeled with a relatively smaller interpolation factor, and so on. The remaining part 425 that can not be modeled by an AIFIR filter may then be processed by a main echo canceller similar to MEC 310 of FIG. 3. In this way, instead of making a design compromises between the main and tail echoes, the multi-sections structure provides more design freedoms in the application of an AIFIR-based echo canceller. Hence, larger complexity reduction may be expected.

FIG. 5 shows a multi-path adaptive interpolated FIR-based echo canceller (MPAIFIR) 500. Each tail section of echo response 405 may correspond to a tail echo canceller (TEC) of MPAIFIR 500. For example, section 410 of FIG. 4 may correspond to TEC 505 and section 420 of FIG. 4 may correspond to TEC 510. Each tail echo canceller, $TEC_i$, may employ a different cut point $\alpha_i$, and interpolation factor $M_i$, which satisfy the condition of $\alpha_i$, $<\alpha_2<\ldots<\alpha_L$ and $M_1<M_2<\ldots<M_L$. As can be seen in FIG. 5, the synthesized echo is obtained by summing the plurality of signal paths 535, 540, 545, and 550, for example, with summer 557.

Moreover, because MPAIFIR 500 may be a pure FIR structure, many existing adaptation algorithms can be employed. In practical implementation, for example, variants of the least-mean-square (LMS) algorithm may be used due to the relatively low memory and computational requirement.

Due to the multi-path nature of MPAIFIR 500, L image compress filters (ICF) 520 may be used. Moreover, given a similar stop-band attenuation, the complexity of an ICF 520 is directly proportional to the interpolation factor M. Specifically, for large M, ICF 520 may dominate the complexity of TEC 505, for example. To overcome the problem, a specialized structure that is very suitable for the multiple ICFs in MPAIFIR 500 may be used. For example, only L low-complexity low pass filters (LPFs) may be used to implement the multi-ICFs structure.

Figure 6:
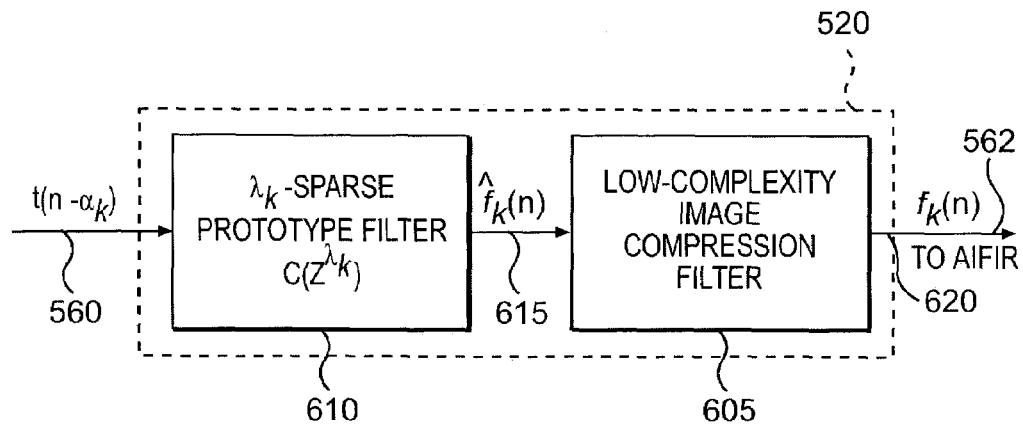
FIG. 6 is a block diagram of a component for providing an image compression signal consistent with an embodiment of the present invention.

To reduce the complexity of the multi-ICFs, the first step is to employ a interpolation FIR (IFIR) filter. That is, the aforementioned narrow-band ICF (with cutoff frequency of 1/M) may again be realized by a sparse prototype FIR filter 610 and a low-complexity image compress filter 605, as shown in FIG. 6. Moreover, due to a transmission signal 530 (with different delay of $\lambda_k$) being the common input, the arithmetic operations can be reused or shared if the same type prototype filter is employed among the ICFs used in MPAIFIR 500. By doing this, the complexity can be significantly reduced.

Specifically, define the $\lambda_k$ as the ratio of $M_k$ to $M_l$, i.e., $\lambda_k \equiv M_k/M_l$, where $M_k$ is, often, a power-of-two value, i.e., $M_k=2^s$, for $1 \leq k \leq L$, and $s \in$ integer. Here, we take the $1^{st}$ image compress filter, $ICF_1$, as the prototype filter, and represents the filter as $$C(z) = \sum_{i=0}^{N_p-1} c_i z^{-1}, \quad (1)$$

where $c_i$ denotes the $i^{th}$ coefficient, and $N_p$ is the order. Moreover, denote t(n) as the symbol to be transmitted (input to the echo canceller). The output of $1^{st}$ image compress filter, $f_1(n)$, can then relate to the input signal t(n) in the form as $$f_1(n+\alpha) = \sum_{i=0}^{N_p-1} c_i \cdot t(n-i) = \sum_{i=0}^{N_p-1} c_i p_i(n), \quad (2)$$

where $p_i(n) \equiv c_i \cdot t(n-i)$ is the $i^{th}$ partial sum of the prototype filter output. In IFIR approach, the $k^{th}$ image compress filter is constructed by cascading $\lambda_k$-sparse prototype filter C(z) and a low-order image compress filter, as illustrated in FIG. 6. For convenience of representation, we also define $\hat{f}_k(n)$ as the output of the $\lambda_k$-sparse prototype filter. And, we can relate $\hat{f}_k(n)$ to $p_i(n)$ as $$\hat{f}_k(n+\alpha_k) = \sum_{i=0}^{N_p-1} c_i \cdot t(n-\lambda_k \cdot i) \quad (3)$$

$$= \sum_{i=0}^{N_p-1} p_i(n-(\lambda_k-1)\cdot i).$$

Figure 7:
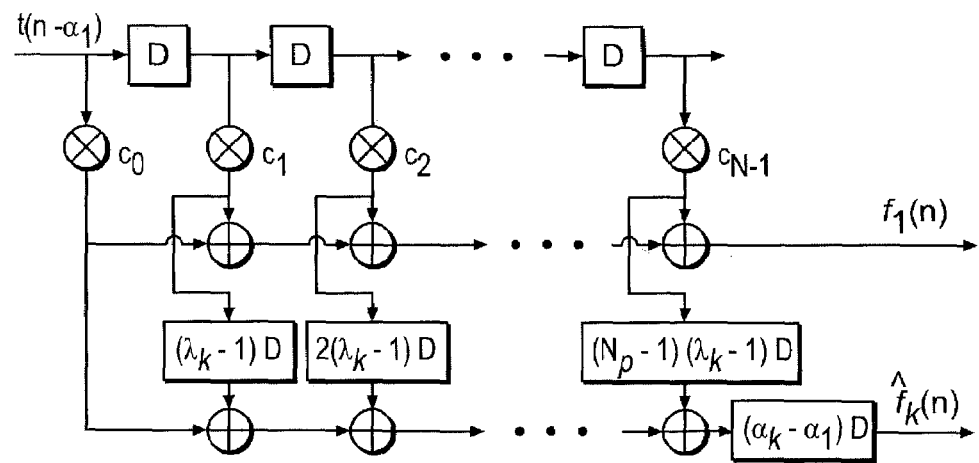
FIG. 7 is a block diagram of an efficient implementation of a multi-ICF based on an IFIR filter consistent with an embodiment of the present invention.

As can be seen in Eq. (3), without taking any multiplications, the output of $\lambda_k$-sparse prototype filter, $\hat{f}_k(n)$, can be obtained by simply summing signal $p_i(n)$ with proper delays. FIG. 7 shows an exemplary VLSI structure that realize Eq. (3). The signal of $\hat{f}_k(n)$ is then send to a low-order lowpass filter, which removes the image component, to generate the output of $ICF_k$, $f_k(n)$, for the subsequent adaptive processing.

In simulations, the system of FIG. 5 is applied to the design of an echo canceller in a SHDSL system. The SHDSL transceiver is capable of supporting data rates in the range of 192 kbps to 2312 kbps using Trellis-Coded PAM (TC-PAM) line code. Basically, the effective length of the echo path increases with the data rate. Hence, the echo path is simulated as a 1024-tap transversal filter with coefficients equal to the two-times highest baud rate-sampled echo impulse response of loop BT1 [3] (i.e. sampling rate=1541.33 k). Also, the target performance of the echo canceller is set to be ERLE=65 dB.

MPAIFIR 500 with L=2 is employed, where $M_1=4$ and $M_2=8$. Prototype filter 610 may be designed by using 23-tap Chebyshev-window with 60 dB stopband attenuation. Low-order image compress filter 605 in the IFIR design of $ICF_2$ may then be designed as a 7-tap Chebyshev-window with 60 dB stopband attenuation. Three sets of parameters are simulated to show the performance of the proposed scheme with the results shown in FIG. 8.

In considering the complexity, the computation is compared to a conventional echo canceller as well as an echo canceller implemented by one long transversal filter, called direct implementation. Note that the complexity is compared under the condition of similar ERLE performance. The configuration for the conventional echo canceller as well as the direct implementation are also shown in FIG. 8 for comparison purposes.

In the complexity estimation of the echo canceller, the bit number of symbols is usually considered. This is because the bit number of multiplicands is quite different for symbols and coefficients. However, the situation no longer holds in some advanced transceivers due to the Tomlinson-Harashima Precoder (THP) involved. The low-bit represented symbol is filtered by THP before performing echo cancellation and spectral shaping. In this case, a large-wordlength is required to represent the symbols, hence the input to the echo canceller. Consequently, the complexity of the echo canceller can be estimated simply counting the number of arithmetic operation involved. FIG. 9 shows the corresponding complexity requirements for the designs in FIG. 8. The results show that MPAIFIR 500 requires about 80% complexity compared with a conventional echo canceller. Only about 40% is needed compared with the direct transversal implementation.

Figure 10:
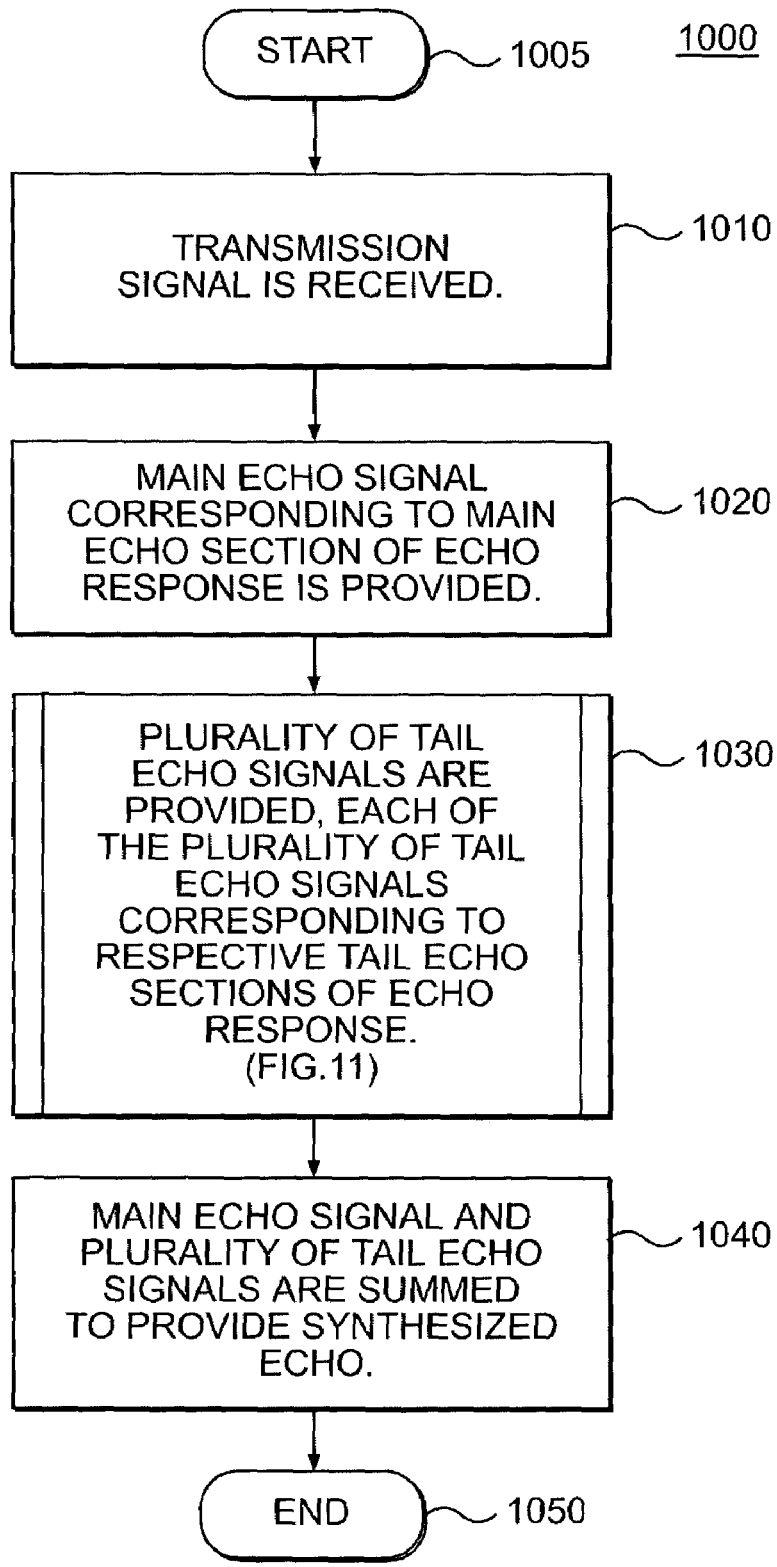
FIG. 10 is a flow chart of an exemplary method for providing multi-path echo cancellation consistent with an embodiment of the present invention.

FIG. 10 is a flow chart setting forth the general stages involved in an exemplary method 1000 for providing a multi-path echo canceller consistent with an embodiment of the present invention. The multi-path echo canceller may comprise MPAIFIR 500 of FIG. 5, for example. The implementation of the stages of exemplary method 1000 in accordance with an exemplary embodiment of the present invention will be described in greater detail in FIG. 11 and FIG. 12. Exemplary method 1000 begins at starting block 1005 and proceeds to stage 1010 where transmission signal 530 is received. For example, transmission signal 530 may utilize digital subscriber line (DSL), high bit rate digital subscriber line (HDSL), symmetric digital subscriber line (SDSL), or symmetric high bit rate digital subscriber line (SHDSL) protocol.

Symmetric DSL is an HDSL variation that uses only one cable pair and is offered in a wide range of speeds from 144 Kbps to 1.5 Mbps. SDSL is a rate adaptive technology, and like HDSL, SDSL cannot share lines with analog telephones.

From stage 1010 where transmission signal 530 is received, exemplary method 1000 advances to stage 1020 where main echo signal 535 corresponding to main echo section 425 of echo response 405, for example, is provided. The interpolation factors for each of the tail echo sections, 410, 422, and 420, for example, of echo response 405 may become progressively larger as the tail echo sections progress from the main echo section. For example, the interpolation factor for tail echo section 410 may be smaller than the interpolation factor for tail echo section 420. Moreover, the interpolation factor for tail echo section 420 may be smaller than the interpolation factor for tail echo section 422. Furthermore, the least-main-square (LMS) algorithm may be used as an adaptation algorithm. The LMS algorithm is exemplary and other algorithms may be used.

Once main echo signal 535 corresponding to main echo section 425 of echo response 405 is provided in stage 1020, exemplary method 1000 continues to exemplary subroutine 1030 where plurality of tail echo signals 540, 545, and 550, for example, are provided, each of the plurality of tail echo signals 540, 545, and 550 corresponding to respective tail echo sections 410, 420, and 422 of echo response 405 respectively. The stages of exemplary subroutine 1030 are shown in FIG. 11 and will be described in greater detail below.

After plurality of tail echo signals 540, 545, and 550 are provided, each of the plurality of tail echo signals 540, 545, and 550 corresponding to respective tail echo sections 410, 420, and 422 of echo response 405 in exemplary subroutine 1030, exemplary subroutine 1000 advances to stage 1040 where main echo signal 535 and plurality of tail echo signals 540, 545, and 550 are summed to provide synthesized echo 555. For example, a summer 557 may be employed to sum main echo signal 535 and plurality of tail echo signals 540, 545, and 550 to provide synthesized echo 555.

From stage 1040 where main echo signal 535 and plurality of tail echo signals 540, 545, and 550 are summed to provide synthesized echo 555, exemplary method 1000 ends at stage 1050.

Figure 11:
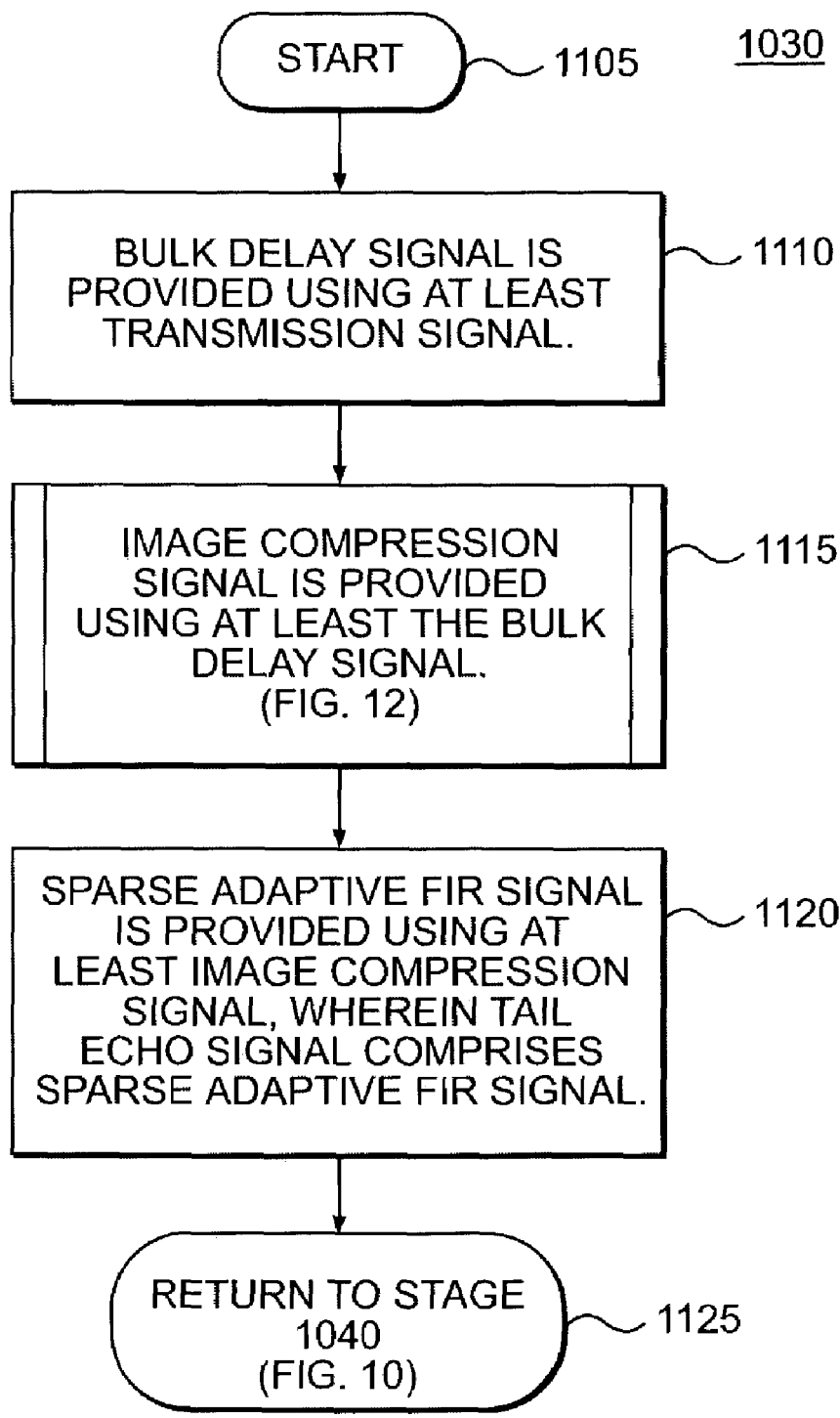
FIG. 11 is a flow chart of an exemplary subroutine used in the exemplary method of FIG. 10 for providing a plurality of tail echo signals consistent with an embodiment of the present invention.

FIG. 11 describes exemplary subroutine 1030 from FIG. 10 for providing plurality of tail echo signals 540, 545, and 550, each of the plurality of tail echo signals 540, 545, and 550 corresponding to respective tail echo sections 410, 420, and 422 of echo response 405. While the following describes subroutine 1030 in terms of the Lth TEC 505, subroutine 1030 may be applied to other TECs of MPAIFIR 500. Exemplary subroutine 1030 begins at starting block 1105 and advances to stage 1110 where bulk delay signal 560 is provided using at least transmission signal 530. For example, providing bulk delay 560 signal may comprise using bulk delay 525.

Once bulk delay signal 560 is provided using at least transmission signal 530 in stage 1110, exemplary subroutine 1030 continues to exemplary subroutine 1115 where an image compression signal 562 is provided using at least bulk delay signal 560. For example, providing image compression signal 562 may comprise using image compression filter 520. The stages of exemplary subroutine 1115 are shown in FIG. 12 and will be described in greater detail below.

Once image compression signal 562 is provided using at least bulk delay signal 560 in exemplary subroutine 1115, exemplary subroutine 1030 advances to stage 1120 where a sparse adaptive FIR signal 565 is provided using at least image compression signal 562, wherein tail echo signal 540 comprises sparse adaptive FIR signal 565. For example, providing sparse adaptive FIR signal 565 may comprise using a sparse adaptive FIR filter 515.

After sparse adaptive FIR signal 565 is provided using at least image compression signal 562 in stage 1120, exemplary subroutine 1030 continues to stage 1125 and returns to decision block 1040 of FIG. 10.

Figure 12:
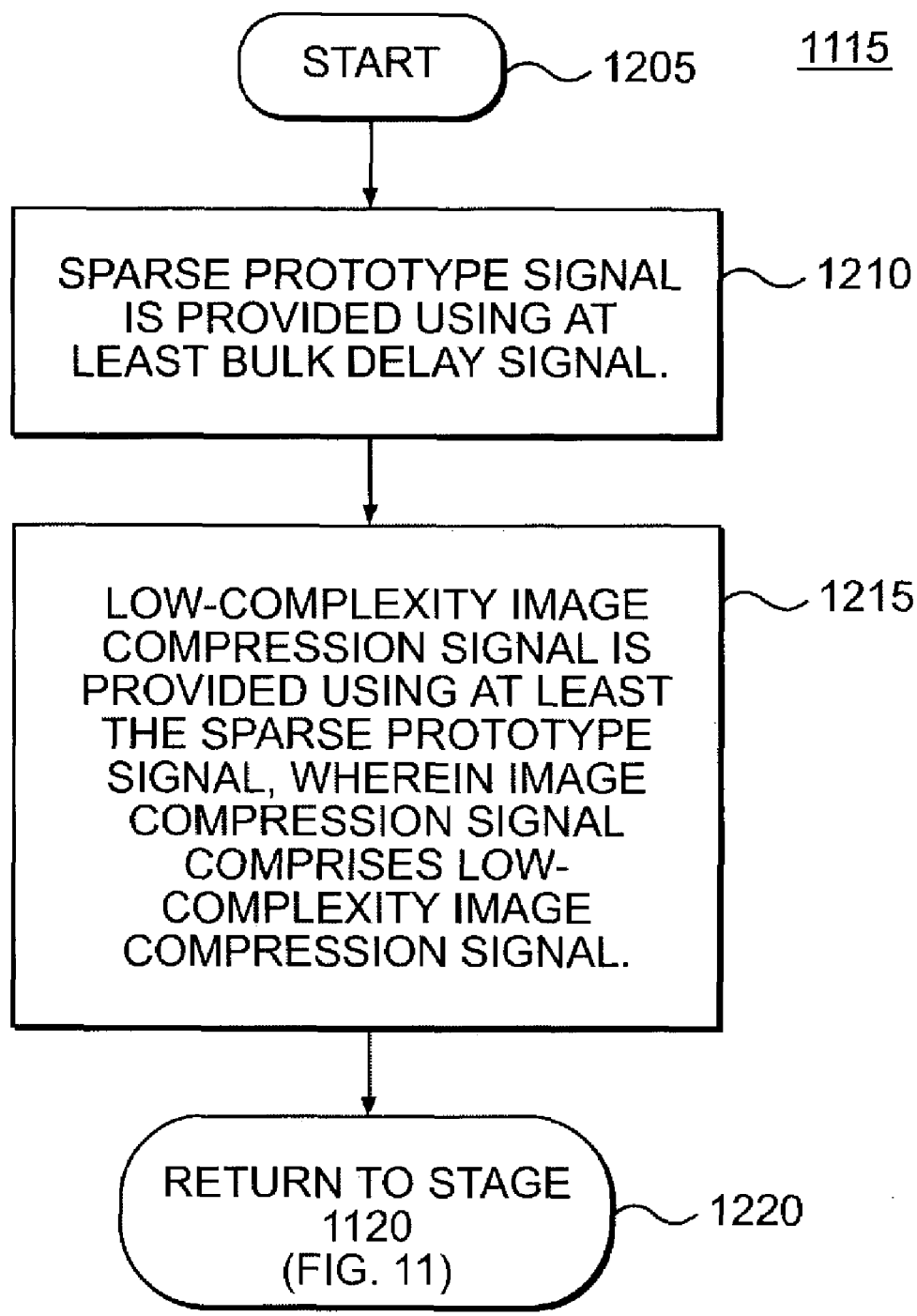
FIG. 12 is a flow chart of an exemplary subroutine used in the exemplary subroutine of FIG. 11 for providing an image compression signal consistent with an embodiment of the present invention.

FIG. 12 describes exemplary subroutine 1115 from FIG. 11 for providing image compression signal 562 using at least bulk delay signal 560. Exemplary subroutine 1115 begins at starting block 1205 and advances to stage 1210 where a sparse prototype signal 615 is provided using at least bulk delay signal 560. For example, providing sparse prototype signal 615 may comprise using a sparse prototype filter 610. Moreover, providing sparse prototype signal 615 may further comprise using a same sparse prototype filter 610 for each of the plurality of tail echo signals 540, 545, and 550. In addition, providing image compression signal 562 may further comprise sharing mathematical operations among other image compression filters within the other TECs of system 500 in FIG. 5, for example. Finally, providing sparse prototype signal 615 may further comprise not using multiplication operations.

After sparse prototype signal 615 is provided using at least bulk delay signal 560 in stage 1210, exemplary subroutine 1115 continues to stage 1215 where low-complexity image compression signal 562 is provided using at least sparse prototype signal 615, wherein image compression signal 562 comprises a low-complexity image compression signal 620. For example, providing low-complexity image compression signal 562 may further comprise using low-complexity image compression filter 605.

Once low-complexity image compression signal 620 is provided using at least sparse prototype signal 615 in stage 1215, exemplary subroutine 1115 continues to stage 1220 and returns to stage 1120 of FIG. 11.

It will be appreciated that a system in accordance with an embodiment of the invention can be constructed in whole or in part from special purpose hardware or a general purpose computer system, or any combination thereof. Any portion of such a system may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for providing multi-path echo cancellation comprising:
    providing a main echo signal corresponding to a main echo section of an echo response;
    providing a plurality of tail echo signals, each of the plurality of tail echo signals corresponding to respective tail echo sections of the echo response; and
    summing the main echo signal and the plurality of tail echo signals to provide a synthesized echo,
    wherein the tail echo sections and the main echo section span the entire echo response.

2. The method of claim 1, further comprising receiving a transmission signal, wherein the transmission signal is used in providing the main echo signal and the plurality of tail echo signals.

3. The method of claim 2, wherein at least one of digital subscriber line (DSL), high bit rate digital subscriber line (HDSL), symmetric digital subscriber line (SDSL), and symmetric high bit rate digital subscriber line (SHDSL) protocols is utilized by the transmission signal.

4. The method of claim 1, wherein providing the plurality of tail echo signals further comprises, for each of the plurality of tail echo signals:
    providing a bulk delay signal using at least a transmission signal;
    providing an image compression signal using at least the bulk delay signal; and
    providing a sparse adaptive FIR signal using at least the image compression signal, wherein the tail echo signal comprises the sparse adaptive FIR signal.

5. The method of claim 1, wherein interpolation factors for each of the tail echo sections of the echo response become progressively larger as the tail echo sections progress from the main echo section.

6. The method of claim 1 further comprising using an adaptation algorithm, the adaptation algorithm being the least-mean-square (LMS) algorithm.

7. A system for providing multi-path echo cancellation comprising:
    a component for providing a main echo signal corresponding to a main echo section of an echo response;
    a component for providing a plurality of tail echo signals, each of the plurality of tail echo signals corresponding to respective tail echo sections of the echo response; and
    a component for summing the main echo signal and the plurality of tail echo signals to provide a synthesized echo,
    wherein the tail echo sections and the main echo section span the entire echo response.

8. The system of claim 7, further comprising a component for receiving a transmission signal, wherein the transmission signal is used by the component for providing the main echo signal and the component for providing the plurality of tail echo signals.

9. The system of claim 8, wherein at least one of digital subscriber line (DSL), high bit rate digital subscriber line (HDSL), symmetric digital subscriber line (SDSL), and symmetric high bit rate digital subscriber line (SHDSL) protocols is utilized by the transmission signal.

10. The system of claim 7, wherein the component for providing the plurality of tail echo signals further comprises, for each of the plurality of tail echo signals:
    a component for providing a bulk delay signal that uses at least a transmission signal;
    a component for providing an image compression signal that uses at least the bulk delay signal; and
    a component for providing a sparse adaptive FIR signal that uses at least the image compression signal, wherein the tail echo signal comprises the sparse adaptive FIR signal.

11. The system of claim 7, wherein interpolation factors for each of the tail echo sections of the echo response become progressively larger as the tail echo sections progress from the main echo section.

12. The system of claim 7 further comprising a component for providing an adaptation algorithm, the adaptation algorithm being the least-mean-square (LMS) algorithm.

13. A computer-readable medium on which is stored a set of instructions for providing multi-path echo cancellation, which when executed perform stages comprising:
    providing a main echo signal corresponding to a main echo section of an echo response;
    providing a plurality of tail echo signals, each of the plurality of tail echo signals corresponding to respective tail echo sections of the echo response; and
    summing the main echo signal and the plurality of tail echo signals to provide a synthesized echo,
    wherein the tail echo sections and the main echo section span the entire echo response.

14. The computer-readable medium of claim 13, further comprising receiving a transmission signal, wherein the transmission signal is used in providing the main echo signal and the plurality of tail echo signals.

15. The computer-readable medium of claim 14, wherein at least one of digital subscriber line (DSL), high bit rate digital subscriber line (HDSL), symmetric digital subscriber line (SDSL), and symmetric high bit rate digital subscriber line (SHDSL) protocols is utilized by the transmission signal.

16. The computer-readable medium of claim 13, wherein providing the plurality of tail echo signals further comprises, for each of the plurality of tail echo signals:
    providing a bulk delay signal using at least a transmission signal;
    providing an image compression signal using at least the bulk delay signal; and
    providing a sparse adaptive FIR signal using at least the image compression signal, wherein the tail echo signal comprises the sparse adaptive FIR signal.

17. The computer-readable medium of claim 13, wherein interpolation factors for each of the tail echo sections of the echo response become progressively larger as the tail echo sections progress from the main echo section.

18. The computer-readable medium of claim 13 further comprising using an adaptation algorithm, the adaptation algorithm being the least-mean-square (LMS) algorithm.

19. A method for providing multi-path echo cancellation comprising:
    providing a main echo signal corresponding to a main echo section of an echo response;
    providing a plurality of tail echo signals, each of the plurality of tail echo signals corresponding to respective tail echo sections of the echo response; and summing the main echo signal and the plurality of tail echo signals to provide a synthesized echo, wherein providing the plurality of tail echo signals further comprises, for each of the plurality of tail echo signals:

providing a bulk delay signal using at least a transmission signal;

providing an image compression signal using at least the bulk delay signal; and providing a sparse adaptive FIR signal using at least the image compression signal, wherein the tail echo signal comprises the sparse adaptive FIR signal.

20. The method of claim 19, wherein providing the bulk delay signal further comprises using a bulk delay.

21. The method of claim 19, wherein providing the image compression signal further comprises using an image compression filter.

22. The method of claim 21, wherein providing the image compression signal further comprises:

providing a sparse prototype signal using at least the bulk delay signal; and providing a low-complexity image compression signal using at least the sparse prototype signal, wherein the image compression signal comprises the low-complexity image compression signal.

23. The method of claim 22, wherein providing the sparse prototype signal further comprises using a sparse prototype filter.

24. The method of claim 22, wherein providing the low-complexity image compression signal further comprises using a low-complexity image compression filter.

25. The method of claim 22, wherein providing the sparse prototype signal further comprises using a same sparse prototype filter for each of the plurality of tail echo signals.

26. The method of claim 25, wherein providing the image compression signal further comprises sharing mathematical operations among image compression filters used to provide the image compression signals for the plurality of tail echo signals.

27. The method of claim 25, wherein providing the sparse prototype signal further comprises not using multiplication operations.

28. The method of claim 19, wherein providing the sparse adaptive FIR signal further comprises using a sparse adaptive FIR filter.

29. A system for providing multi-path echo cancellation comprising:

a component for providing a main echo signal corresponding to a main echo section of an echo response;

a component for providing a plurality of tail echo signals, each of the plurality of tail echo signals corresponding to respective tail echo sections of the echo response; and a component for summing the main echo signal and the plurality of tail echo signals to provide a synthesized echo, wherein the component for providing the plurality of tail echo signals further comprises, for each of the plurality of tail echo signals:

a component for providing a bulk delay signal that uses at least a transmission signal;

a component for providing an image compression signal that uses at least the bulk delay signal; and a component for providing a sparse adaptive FIR signal that uses at least the image compression signal, wherein the tail echo signal comprises the sparse adaptive FIR signal.

30. The system of claim 29, wherein the component for providing the bulk delay signal comprises a bulk delay.

31. The system of claim 29, wherein the component for providing the image compression signal comprises an image compression filter.

32. The system of claim 31, wherein the component for providing the image compression signal comprises:

a component for providing a sparse prototype signal that uses at least the bulk delay signal; and wherein the component for providing the image compression signal is configured to use at least the sparse prototype signal.

33. The system of claim 32, wherein the component for providing the sparse prototype signal comprises a sparse prototype filter.

34. The system of claim 32, wherein the component for providing the image compression signal is a low-complexity image compression filter.

35. The system of claim 32, wherein the component for providing the sparse prototype signal comprises a same sparse prototype filter for each of the plurality of tail echo signals.

36. The system of claim 35, wherein the component for providing the image compression signal further shares mathematical operations among image compression filters used to provide the image compression signals for the plurality of tail echo signals.

37. The system of claim 35, wherein the component for providing the sparse prototype signal does not use multiplication operations.

38. The system of claim 29, wherein the component for providing the sparse adaptive FIR signal comprises a sparse adaptive FIR filter.

39. A computer-readable medium on which is stored a set of instructions for providing multi-path echo cancellation, which when executed perform stages comprising:

providing a main echo signal corresponding to a main echo section of an echo response;

providing a plurality of tail echo signals, each of the plurality of tail echo signals corresponding to respective tail echo sections of the echo response; and summing the main echo signal and the plurality of tail echo signals to provide a synthesized echo, wherein providing the plurality of tail echo signals further comprises, for each of the plurality of tail echo signals:

providing a bulk delay signal using at least a transmission signal;

providing an image compression signal using at least the bulk delay signal; and providing a sparse adaptive FIR signal using at least the image compression signal, wherein the tail echo signal comprises the sparse adaptive FIR signal.

40. The computer-readable medium of claim 39, wherein providing the bulk delay signal further comprises using a bulk delay.

41. The computer-readable medium of claim 39, wherein providing the image compression signal further comprises using an image compression filter.

42. The computer-readable medium of claim 41, wherein providing the image compression signal further comprises:

providing a sparse prototype signal using at least the bulk delay signal; and providing a low-complexity image compression signal using at least the sparse prototype signal, wherein the image compression signal comprises the low-complexity image compression signal.

43. The computer-readable medium of claim 42, wherein providing the sparse prototype signal further comprises using a sparse prototype filter.

44. The computer-readable medium of claim 42, wherein providing the low-complexity image compression signal further comprises using a low-complexity image compression filter.

45. The computer-readable medium of claim 42, wherein providing the sparse prototype signal further comprises using a same sparse prototype filter for each of the plurality of tail echo signals.

46. The computer-readable medium of claim 45, wherein providing the image compression signal further comprises sharing mathematical operations among image compression filters used to provide the image compression signals for the plurality of tail echo signals.

47. The computer-readable medium of claim 45, wherein providing the sparse prototype signal further comprises not using multiplication operations.

48. The computer-readable medium of claim 39, wherein providing the sparse adaptive FIR signal further comprises using a sparse adaptive FIR filter.

* * * * *